La Fayette Louis,
Tremolo.
No. 3,184. Reissued Nov. 10, 1868.
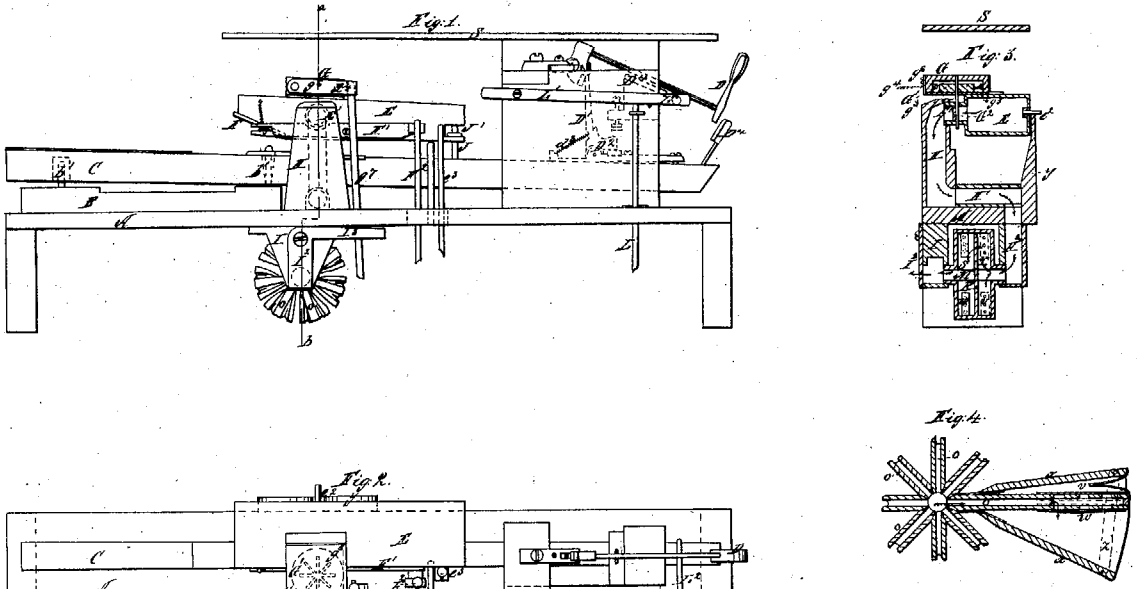
Witnesses:
E. B. Horbnal
C. M. Burns
Inventor:
La Fayette Louis
THE NORRIS PETERS CO., WASHINGTON, D. C.

United States Patent Office.

LAFAYETTE LOUIS, OF BOSTON, MASSACHUSETTS.

*Letters Patent No.* 35,528, *dated June* 10, 1862; *reissue No.* 3,184, *dated November* 10, 1868.

DIVISION A.

IMPROVEMENT IN PIANOS WITH MELODEON AND TREMOLO-ATTACHMENT.

The Schedule referred to in these Letters Patent and making part of the same.

*To all whom it may concern:*

Be it known that I, LAFAYETTE LOUIS, of Boston, in the county of Suffolk, and State of Massachusetts, (formerly of Buffalo, New York,) have invented new and useful Improvements in Piano-Fortes, with Melodeon and Tremolo-Attachment; and I do hereby declare that the following is a full and exact description thereof, reference being had to the accompanying drawings, in which—

Figure I is a vertical cross-section of a piano-forte, including the combination and arrangement of my improvements therewith.

Figure II is a plan of the same, with sound-board removed.

Figure III is a vertical cross-section, taken on line *a b* of Fig. I.

Figure IV is a section to represent more fully the construction of the compound rotary bellows.

Letters of like name and kind refer to like parts in each of the figures.

The nature of my invention relates primarily to the arrangement of melodeon-tube board, reeds, and swell above the keys and below the sounding-board of a piano-forte, in a manner to obtain the effect of two banks of keys, or two separate instruments played at the same time.

Also, to the arrangement of three or more octaves of melodeon-reeds, in connection with the treble-part of the piano-forte key-board, for the purpose, and so as to secure a new musical effect, viz, a wind and legato melody, in combination with a piano and staccato accompaniment.

Also, to the combination and arrangement of a conducting-tube or hollow shaft, through which the wind passes, and lever for lifting, with a melodeon-tube board and piano-forte, whereby the performer is enabled instantly, and at pleasure, to connect the melodeon-tube board to and disconnect it from the piano-forte, thereby restoring the "original touch" of the piano when disconnected.

Also, to placing the melodeon-attachment in such relation to the piano-forte keys, as that, by striking single keys, octaves will be produced, viz, each note of the melodeon-attachment sounding one octave lower than the note of the piano.

Also, to connecting the bellows placed under the piano with the melodeon-tube board placed over the piano-keys, by means of a conducting-pipe or tube passing from the bellows to the tube-board.

Also, the combination of a tremolo-attachment with the melodeon-tube board and piano-forte.

A represents a cross-section of the bottom of a piano-forte of common construction.

B is the key-frame, and *b'* guide-pins.

C represents one key of a piano-forte, all the keys of which would be constructed and arranged in the same manner.

D, hammer; $D^1$, jack, hinged to the key, as shown at $D^2$, and projecting upwardly to lift the hammer when the key is struck; $d^3$, spring. These parts are common and well known. $D^4$, back-rest; S, sound-board.

E represents a melodeon-tube board, which, when constructed and used according to my improvements, should contain air-chamber and reeds to the extent of three or more octaves.

This tube-board is hung upon a shaft or journals, upon which it oscillates as a centre. One of the journals, marked $E^1$, is hollow, and forms a wind-tube, or a portion of the wind-passage from the tube-board to the bellows. One end of this hollow journal opens into the air-chamber of the melodeon-tube board, and the other into the air-tube H, all of which is shown in fig. 3. The other journal is made of smaller size, and is supported upon the standard *y*, as shown at $e^2$. The tube-board will turn upon these journals as a centre, whenever it is desired to disconnect the tube-board and piano-keys. This is accomplished by means of a rod or lever, $e^3$, hinged to the tube-board, and dropping down through the bottom of the piano, and connecting with a treadle, or otherwise. The thrust of this rod upwardly will lift that part of the tube-board which connects with the piano-keys, entirely free from the piano-keys, (the melodeon-tube board turning upon its journals, as before described,) and thereby a connection or a disconnection between the two instruments is instantly effected at the will of the performer, the original "touch" of the piano being instantly restored, when the two instruments are disconnected.

J is one of the push-pins which form the connection between the two instruments. These pins are supported by the plate $J^1$, one end of the pin touching the piano-key, and the other end is in such near proximity to the melodeon-valves, that, by striking the piano-key, this pin is thrust upwardly, in a manner to open the valves of the melodeon-reeds, thereby producing simultaneously a string or piano-tone, and a wind or melodeon-tone, the melodeon-tone sounding one octave lower than the piano-tone. This forms a coupling of octaves, which is believed to be new, and which produces the effect, in some passages of music, of two performers upon two instruments.

F, swell; $F^1$ and $F^2$ are levers connecting the swell with treadles under the piano, for opening the swell.

G, tremolo, in combination with the melodeon-tube board. (A tremolo was patented by me, November 18, 1856, to which reference may be had.)

$G^1$, tremolo-wheel; $G^2$, tremolo-valve. The wheel and valve are upon the shaft $g^3$.

At $g^4$ is shown an orifice, which opens from the external air into the tremolo; and at $g^5$ is shown an orifice which opens out of the tremolo into the air-chamber of the tube-board, so that the inward passing of the air will revolve the wheel.

At $g^6$ is represented a valve, which covers the orifice $g^4$. This valve is operated by means of the lever $g^7$, which connects with the treadle under the bottom of the piano. By this arrangement, the air may be let in or shut off from the tremolo at pleasure.

H represents a hollow standard or tube, which connects with the hollow-journal $E^1$ of the tube-board, and forms a journal-bearing therefor. There is also a cross or continuation-tube, $H^1$, which leads from this to the hollow hanger $H^2$. The bellows-shaft M is also made hollow at its ends, but solid at its centre, so that the air cannot pass directly through the bellows-shaft, but is drawn in at one end of the shaft by suction, and fills the bellows, and is discharged at the other end by pressure, so that there is a complete air-passage from the tube-board through the bellows, as indicated by the arrows in Fig. III.

I represents a hanger, made fast to the bottom of the piano, and dropping down, for the support of one end of the bellows-shaft. The other end of the bellows-shaft is supported in the hollow hanger $H^2$, which also, and in a similar manner, is made fast to the bottom of the piano.

The hanger I has an aperture, in conjunction with the open end of the bellows-shaft, for the escape of the air from the pressure-side of the bellows.

$I^2$ represents a valve or stop, which covers this aperture, and $I^3$ is a lever for operating the valve. This valve or stop is so placed and arranged that the performer may partly or fully open and close the aperture at pleasure. When it is closed, so that the air cannot freely escape, the force of the weights upon the bellows is neutralized, and when opened for a free escape of the air, the force of the bellows is restored, and hence full power of air upon the melodeon-reeds. This improvement gives me entire control of the air-power of the bellows, and enables me so to combine and use the suction and pressure-principles as to produce a new musical effect, viz, a perfect "crescendo" and "diminuendo."

L is a lever, which connects with a hinged lever, $L^1$, which also has an arm, $L^2$, projecting at right angles thereto, and passes under the piano-hammers, and in close proximity thereto, so that the piano-hammers may be raised simultaneously, to the extent of three or more octaves, by an upward thrust of the lever L, thereby preventing the hammers from striking the strings, while, at the same time, the same number of melodeon-reeds remains to be actuated by the piano-forte keys, thus enabling the performer to play with the right hand a wind-melody exclusive of piano, and with the left hand, a piano-accompaniment exclusive of the wind-tone.

The bellows has rigid arms O, which are divided into two parts or air-chambers, S and T, by the partition R.

Ingress and egress-air valves are made in these rigid arms, as shown at V and W, the valves V connecting with the suction-part of the bellows, and the valves W with the pressure-part.

The flaps X, on either side of the rigid arms, are connected by the rigid bar Z, which also forms a weight which acts at the same time upon both the suction and pressure-parts of the bellows.

The bellows is revolved by pedal and crank, or by spring and clock-work, or by other appropriate and well-known means.

The flap which is falling towards the stationary arm is pressing or forcing the air out, and the flap which is falling from the stationary arm is sucking the air in, and these two principles must act simultaneously and equally, for they are connected by the weighted bar Z. Hence, confining the air in the pressure-part of the bellows, by means of the valve $I^2$, will prevent or retard the pressure-flap from falling towards the stationary arm, and at the same time prevent or retard the suction-flap from falling from the stationary arm, and thereby neutralize the power of the weights, and regulate the quantity of tone, at will.

What I claim as my invention, and desire to secure by Letters Patent, is—

The arrangement of a melodeon-tube board (including reeds and swell) above the keys and below the sounding-board of a piano-forte, in the manner, and for the purposes, and substantially as described.

Also, so combining and arranging a melodeon-tube board with a piano-forte, that the performer can instantly, and at pleasure, disconnect the melodeon-tube board from the piano-forte keys, in the manner substantially as herein set forth.

Also, the combination of a tremolo-attachment with the melodeon.

Also, in combination with a piano-forte, a melodeon having a connection of the bellows with the tube-board by means of a tube.

LAFAYETTE LOUIS.

Witnesses:
C. C. DICKERMAN,
FRANCIS GOULD.